United States Patent
Bhatia (10) Patent No.: US 7,702,661 B2
(45) Date of Patent: Apr. 20, 2010

(54) MANAGING CHECKED OUT FILES IN A SOURCE CONTROL REPOSITORY

(75) Inventor: Rishi Bhatia, Walpole, MA (US)

(73) Assignee: Computer Associates Think, Inc., Islandia, NY (US)

( * ) Notice: Subject to any disclaimer, the term of this patent is extended or adjusted under 35 U.S.C. 154(b) by 617 days.

(21) Appl. No.: 11/070,809

(22) Filed: Mar. 2, 2005

(65) Prior Publication Data

US 2006/0200791 A1 Sep. 7, 2006

(51) Int. Cl.
*G06F 17/30* (2006.01)

(52) U.S. Cl. .................. 707/203; 707/102; 707/204; 715/229; 717/120

(58) Field of Classification Search ............... 707/102, 707/203, 204
See application file for complete search history.

(56) References Cited

U.S. PATENT DOCUMENTS

| | | | | |
|---|---|---|---|---|
| 4,558,413 | A * | 12/1985 | Schmidt et al. | 707/203 |
| 5,442,786 | A * | 8/1995 | Bowen | 707/102 |
| 5,675,802 | A * | 10/1997 | Allen et al. | 717/103 |
| 5,721,919 | A * | 2/1998 | Morel et al. | 707/203 |
| 5,787,444 | A * | 7/1998 | Gerken et al. | 707/203 |
| 5,903,897 | A * | 5/1999 | Carrier et al. | 707/203 |
| 5,909,688 | A * | 6/1999 | Yoshioka et al. | 707/200 |
| 5,930,794 | A * | 7/1999 | Linenbach et al. | 707/100 |
| 6,112,024 | A * | 8/2000 | Almond et al. | 717/122 |
| 6,275,787 | B1 * | 8/2001 | Baisley | 703/22 |
| 6,279,003 | B1 | 8/2001 | Lee | |
| 6,301,592 | B1 * | 10/2001 | Aoyama et al. | 715/511 |
| 6,480,865 | B1 | 11/2002 | Lee | |
| 6,502,112 | B1 | 12/2002 | Baisley | |
| 6,560,616 | B1 | 5/2003 | Garber | |
| 6,560,620 | B1 | 5/2003 | Ching | |
| 6,658,626 | B1 | 12/2003 | Aiken | |
| 6,675,353 | B1 | 1/2004 | Friedman | |
| 6,831,668 | B2 * | 12/2004 | Cras et al. | 715/853 |

(Continued)

FOREIGN PATENT DOCUMENTS

CA    2 255 047 A1    5/2000

(Continued)

OTHER PUBLICATIONS

Rational Clear Case Command Reference, Jun. 2003, Rational Software Development Company, XP-002387958, pp. 492-497.*

(Continued)

*Primary Examiner*—Pierre M Vital
*Assistant Examiner*—Christopher P Nofal
(74) *Attorney, Agent, or Firm*—Baker Botts L.L.P.

(57) ABSTRACT

A system and method for managing at least one checked out file of a source control management repository are provided. The system includes a source control repository including at least one checked out file; a database including at least one parameter associated with the at least one checked out file; and a computing device for identifying the at least one checked out file, retrieving the at least one parameter associated with the at least one checked out file, and generating a report including the at least one parameter. The report may be presented to a user via a display or formatted as an XML file to be employed in other computing applications, e.g., automated backups.

25 Claims, 5 Drawing Sheets

U.S. PATENT DOCUMENTS

| | | | |
|---|---|---|---|
| 6,848,078 B1 | 1/2005 | Birsan | |
| 6,859,810 B2 | 2/2005 | Andrei | |
| 6,895,364 B2 * | 5/2005 | Banfer | 702/183 |
| 6,904,562 B1 | 6/2005 | Hind | |
| 6,938,029 B1 * | 8/2005 | Tien | 707/1 |
| 6,961,732 B2 * | 11/2005 | Hellemann et al. | 707/102 |
| 6,961,760 B2 | 11/2005 | Li | |
| 7,096,421 B2 | 8/2006 | Lou | |
| 7,107,298 B2 * | 9/2006 | Prahlad et al. | 707/204 |
| 7,120,652 B2 * | 10/2006 | Maslowski | 707/203 |
| 7,162,501 B2 | 1/2007 | Kupkova | |
| 7,284,190 B2 * | 10/2007 | Chellis et al. | 715/229 |
| 7,302,444 B1 * | 11/2007 | Dunmore et al. | 707/102 |
| 7,356,779 B2 * | 4/2008 | Cras et al. | 715/853 |
| 7,370,118 B2 | 5/2008 | Tan | |
| 7,392,471 B1 | 6/2008 | Ford | |
| 7,437,664 B2 | 10/2008 | Borson | |
| 7,493,347 B2 * | 2/2009 | Smith | 707/202 |
| 2002/0184252 A1 | 12/2002 | Holtz | |
| 2003/0074401 A1 | 4/2003 | Connell | |
| 2003/0084424 A1 | 5/2003 | Reddy | |
| 2003/0101164 A1 | 5/2003 | Pic | |
| 2003/0177442 A1 | 9/2003 | Lou | |
| 2003/0237047 A1 | 12/2003 | Borson | |
| 2004/0025117 A1 | 2/2004 | Ingersoll et al. | |
| 2004/0068586 A1 | 4/2004 | Xie et al. | |
| 2004/0117412 A1 * | 6/2004 | Tran et al. | 707/203 |
| 2004/0205509 A1 | 10/2004 | Lou | |
| 2004/0210599 A1 | 10/2004 | Friedman | |
| 2004/0220980 A1 * | 11/2004 | Forster | 707/204 |
| 2005/0039117 A1 | 2/2005 | Lou | |
| 2005/0060140 A1 | 3/2005 | Maddox | |
| 2005/0060645 A1 | 3/2005 | Raghavachari | |
| 2005/0144598 A1 | 6/2005 | Sabadell | |
| 2005/0192990 A1 | 9/2005 | Kharitidi | |
| 2005/0235009 A1 | 10/2005 | Purdy | |
| 2006/0015807 A1 * | 1/2006 | Chellis et al. | 715/511 |
| 2006/0136814 A1 | 6/2006 | Spada | |
| 2006/0200505 A1 * | 9/2006 | Bhatia | 707/204 |
| 2008/0086718 A1 * | 4/2008 | Bostick et al. | 717/120 |

FOREIGN PATENT DOCUMENTS

| | | |
|---|---|---|
| WO | WO 03/077156 A1 | 9/2003 |
| WO | WO 03/077558 A2 | 9/2003 |
| WO | WO 2004/019231 A2 | 3/2004 |

OTHER PUBLICATIONS

Microsoft Computer Dictionary, May 1, 2002, Microsoft Corporation, Fifth Edition, pp. 1-3.*

"Customizing ClearCase Reports", Intellectual Property Notices and other Licensing Requirements; May 13, 2003, IBM Software Corporation, Version 2003.06.00, pp. 1-33.*

"IBM Rational ClearCase", Apr. 15, 2008, Wikipedia, pp. 1-6.*

PCT Notification of Transmittal of the International Search Report and the Written Opinion of the International Searching Authority, or the Declaration, for International Application No. PCT/US2006/007673, 10 pages, Jul. 13, 2006.

Rational; "Rational ClearCase Command Reference (A-L)"; URL:http://www.elink.ibmlink.ibm.com/public/applications/publications/cgibin/pbi.cgi?CTY=US&FNC=SRX&PBL=G126-5328-00; XP-002387958; 8 pages, Jun. 29, 2006.

Chang, George J.S.; Patel, Girish; Relihan, Liam; and Wang, Jason T. L., "A Graphical Environment for Change Detection in Structured Documents", XP 10247357A, 1997 IEEE, pp. 536-541, 1997.

Senivongse, "Enabling Flexible Cross-Version Interoperability for Distributed Services" 20 pages, 1999.

UDDI.ORG: "UDDI Technical White Paper", vol. 1, XP 00230398 (13 pages), Sep. 6, 2000.

Mit, Inria, Keio; "W3C—Document Object Model (DOM) Level 1 Specification"; XP007901240; pp. 1-90, Sep. 29, 2000.

Mit, Inria, Keio; "2.5.5. Object Definitions"; XP007901240; pp. 91-180, Sep. 29, 2000.

Mit, Inria, Keio; "D2: Document Object Model Level 1 HTML" XP007901240; pp. 181-212, Sep. 29, 2000.

Wang, Yuan; DeWitt, David J.: and Cai, Jin-Yi, "X-Diff: An Effective Change Detection Algorithm for XML Documents", XP 10678765A, 2003 IEEE, pp. 519-530, 2003.

Rahm, "Matching Large XML Schemas," vol. 33, Dec. 2004.

Notification of Transmittal of the International Search Report and the Written Opinion of the International Searching Authority for International Application No. PCT/US2005/017781, filed May 19, 2005 (12 pages), Sep. 19, 2005.

Notification of Transmittal of the International Search Report and the Written Opinion of the International Searching Authority for International Application No. PCT/US2005/017788, filed May 19, 2005, (11 pages).

Notification of Transmittal of The International Search Report and The Written Opinion for International Application No. PCT/US2006/010601, 12 pgs, Nov. 2, 2006.

USPTO Office Action, U.S. Appl. No. 11/132,633, Inventor Betts, 12 pages, May 22, 2008.

USPTO Office Action, U.S. Appl. No. 11/132,633, Inventor Betts, 12 pages, Dec. 2, 2008.

USPTO Office Action, U.S. Appl. No. 11/132,633, Inventor Betts, 10 pages, May 4, 2009.

USPTO Office Action, U.S. Appl. No. 11/088,700, Inventor Bhatia, 18 pages, Aug. 9, 2007.

USPTO Office Action, U.S. Appl. No. 11/088,700, Inventor Bhatia, 22 pages, Jan. 25, 2008.

USPTO Office Action, U.S. Appl. No. 11/088,700, Inventor Bhatia, 26 pages, Dec. 17, 2008.

USPTO Office Action, U.S. Appl. No. 11/088,700, Inventor Bhatia, 23 pages, May 20, 2009.

* cited by examiner

ENTERPRISE BASED DATA RETRIEVAL FROM HARVEST

FROM FIG. 4A

ENTERPRISE BASED DATA RETRIEVAL FROM ENDEVOR CM

FROM FIG. 4A

MANAGING CHECKED OUT FILES IN A SOURCE CONTROL REPOSITORY

BACKGROUND

1. Field

The present disclosure relates generally to data processing and computing systems, and more particularly, to a method and system for file management of checked out or open files of a source control management repository.

2. Description of the Related Art

The IT world is in a constant state of flux with new technologies, applications and platforms being constantly developed. In this ever-changing environment, application development managers and Chief Information Officers need to eliminate as much risk as possible. Most organizations must manage or support complex multiplatform applications that span the enterprise, including the mainframe server. For example, an online ticketing program for an airline has a web front-end. Its browser-based interface is connected to a back-office application on a UNIX server that also interacts with a DB2 database on the mainframe. While the application has components on several different platforms, it is still considered a single application because it serves a single business purpose—managing airline ticketing processing.

Additionally, the teams working on these complex, multi-tiered projects may be deployed around the world to take advantage of "follow-the-sun" development. For example, at the end of their day, a team in California hands off its development projects to a team in Japan, who then turns it over to a third team in the UK, and that group turns it over to a team in New York and so on.

Furthermore, presently a majority of applications have a web front-end—with all the associated HTML pages and web content—to capitalize on Internet-driven business opportunities. Therefore, Change Control Management (CCM) solutions have emerged as essential infrastructure components in the enterprise-wide application development arena.

Change Control Management software provides life cycle management, source version control and configuration management capabilities. Conventional source control management products are designed to manage code changes as they are checked back into the source control repository. With today's distributed environments and multiple projects underway, developers have many unfinished projects on their machine's that are not checked back up in the source control repositories for long periods of time. Every developer and organization is at a great risk for not managing the code that is not included the checked-in file repository.

Currently, developers have to manually remember the physical location from where the files were checked out and manually backup these files. Then, the developers have to remember the correlation between the physical locations of the file, the software packages it is associated with and the actual backed up location. With a single user involved in a project generally having multiple machines and multiple projects, the problem of keeping track of the checked out files for all the different projects is a very cumbersome and tedious process. This makes it hard to manage multiple files for a single developer and nearly impossible to achieve at an enterprise level.

Therefore, a need exists for techniques to allow users, developers and administrators to easily and conveniently manage checked out or open files from a source control repository.

SUMMARY

A system and method for managing at least one checked out file of a source control repository are provided. More specifically, a report is generated for each checked out file of a source control repository which allows a change control management (CCM) server to track the checked out file and determine whether the checked out file should be backed up. The report may include the following parameters associated with the checked out file: repository name, project name, state name, package group, package name, physical location of the checked out file, actual repository location of the file, date when the file was checked out, version, and creator.

In one aspect of the present disclosure, a method for managing at least one checked out file is provided, the method including the steps of identifying the at least one checked out file of a source control repository; retrieving at least one parameter associated with the at least one checked out file, the at least one parameter stored in query database; generating a report including the at least one parameter; and presenting the report to a user.

In another aspect of the present disclosure, a system for managing at least one checked out file is provided, the system including a source control repository including at least one checked out file; a database including at least one parameter associated with the at least one checked out file; and a computing device for identifying the at least one checked out file, retrieving the at least one parameter associated with the at least one checked out file, and generating a report including the at least one parameter. The report may be presented to a user via a display or formatted as an XML file to be employed in other computing applications, e.g., automated backups.

In a further aspect of the present disclosure, a set of computer-executable instructions for managing at least one checked out file is provided, the computer-executable instructions include the steps of identifying the at least one checked out file of a source control repository; retrieving at least one parameter associated with the at least one checked out file, the at least one parameter stored in query database; generating a report including the at least one parameter; and presenting the report to a user.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for file management of a source control management repository are provided. The system and method of the present disclosure provide a user with all the information required to keep track of checked out or open files in a source control repository of a Life Cycle Management (LCM) system, e.g., AllFusion™ commercially available from Computer Associates International, Inc. of Islandia, N.Y. The system and method will generate a report, e.g., a "Checked out item" report, and it may contain the following information:

i. Group Name
ii. User Name
iii. Broker Name
iv. Repository Name
v. Project Name
vi. State Name
vii. Package group
viii. Package Name
ix. Physical location of the checked out file (\\MachineName\Fully Qualified Path)
x. Actual repository location of the file in the LCM (View Path)
xi. Date when the file was checked out
xii. Other Misc information (branched files, versions, Status (Released or not), Creator, Created on, Modifier, Modified on).

The organization of the report provides valuable information, since it compiles identification and location data concerning a file from a plurality of sources. Each field of the report will now be described. "Group Name" field contains information about one or more user groups to which a user belongs. "User Name" field is used to store a user name of a person who is currently working with the checked out file, e.g., Harvest user name. "Broker Name" contains the name of the broker, i.e., the location of the repository. "Repository Name" includes the name of the repository for which the report was generated. "Project Name" contains the name of the project which contains open files. "State Name" stores the State where the project is located. "Package group" contains the name of the package group, e.g., a collection of files. "Physical location of the checked out file" describes the fully qualified path for the location from which the file is checked out. The physical location is specified by the user when a check out for update process is run. "Actual repository location of the file in the LCM (View Path)" is the absolute repository path. Date when the file was checked out corresponds to the time stamp when the check out for update process for performed. One skilled in the art will understand that these parameters may contain information other than described above. In addition, the report may contain any number of the parameters discussed above as well as additional parameters which help to identify the file required to be backed up. Other information may include, but is not limited to, branched files, versions, status (e.g., whether released or not), creator, time of the creation, modifier, time of the modification, etc.

Based on the report generated, the system and method will have the ability to create an external XML report file with all the information. This report will then be fed to external applications like backup agents, external agents or workflow applications.

An exemplary system employing the generated report of the present disclosure is described in concurrently filed copending U.S. patent application Ser. No. 11/070,787, entitled "SYSTEM AND METHOD FOR BACKING UP OPEN FILES OF A SOURCE CONTROL MANAGEMENT REPOSITORY" the contents of which are hereby incorporated by reference in its entirety.

Furthermore, the system and method has the ability to create a diff file, e.g., a differential file, for all the checked out files.

The system will implement a User Interface (UI) or a command line utility to allow the user to customize the format of the report and add new fields at run time. The UI may also give the user the ability to query the report by the main fields (e.g., group, user name, repository name, project name, state name, package name, the client location or the client machine name, repository location of the file check out date and the server name).

The method of the present disclosure is implemented in a server process that can be queried to retrieve this report. Storage of this report will be in an encrypted form by the server. Once the report is created, the server process will keep track of the information and determine whether the information in the report is out of date, and if so, automatically update the information. Updating the report can be done on per user or per project basis. The process can be run by the server when it is idle or at a certain predetermined time or when a dynamic request is received.

Figure 1:
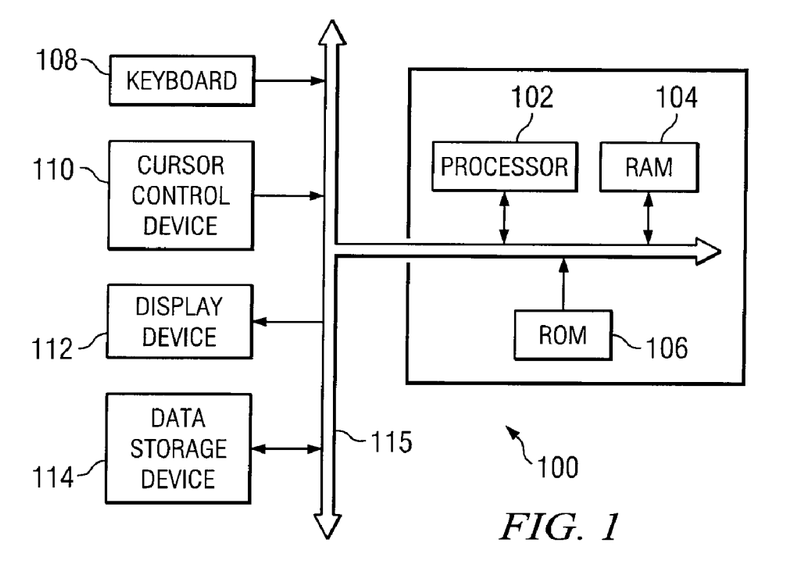
FIG. 1 is a block diagram of an exemplary system for managing checked-out files of a source control management repository in accordance with an embodiment of the present disclosure.

It is to be understood that the present invention may be implemented in various forms of hardware, software, firmware, special purpose processors, or a combination thereof. In one embodiment, the present disclosure may be implemented in software as an application program tangibly embodied on a computer-readable medium. For example. the present disclosure may be implemented in software as an application program tangibly embodied on a program storage device such as data storage device 114 illustrated in FIG. 1. The application program may be uploaded to, and executed by, a machine 100 comprising any suitable architecture such as a personal computer, a workstation or server. Referring to FIG. 1, preferably, the machine 100 is implemented on a computer platform having hardware such as one or more central processing units (CPU) 102, a random access memory (RAM) 104, a read only memory (ROM) 106 and input/output (I/O) interface(s) such as a keyboard 108, cursor control device 110 (e.g., a mouse or joystick) and display device 112. A system bus 115 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform by various interfaces and bus structures, such as a parallel port, serial port or universal serial bus (USB), for example, additional storage devices and a printer.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure. The authentication method of the present disclosure may be used at several levels, including operating system, application, or application components.

Figure 2:
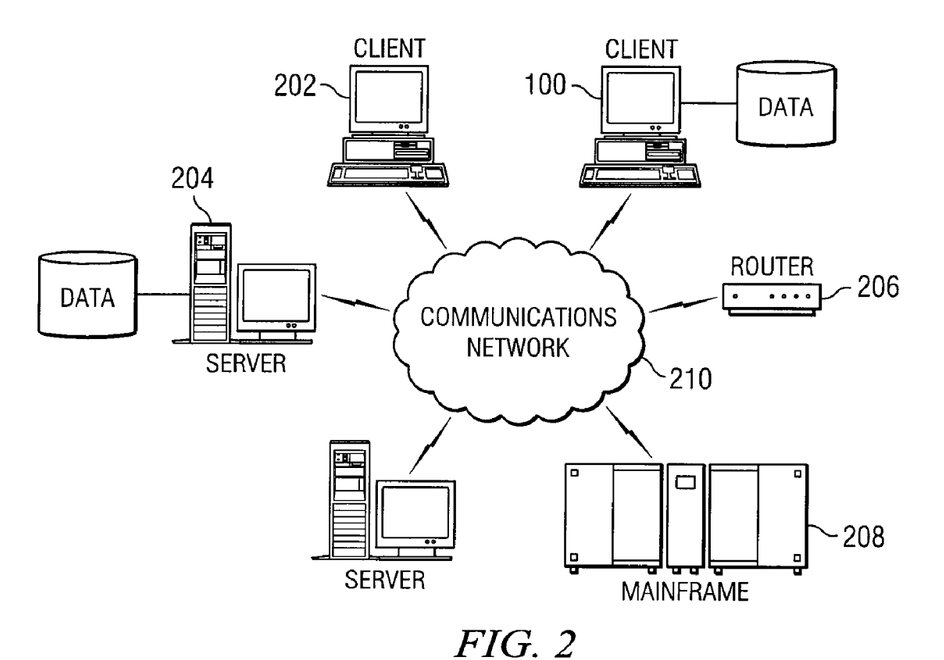
FIG. 2 is an exemplary enterprise computing system.

The computer 100 may operate in a networked environment using logical connections to one or more remote computers as shown in FIG. 2. The remote computer may be a personal computer 202, a server 204, a router 206, a mainframe 208, a network PC, a peer device or other common network node, and typically includes many or all of the elements described above relative to the computer 100. It is to be appreciated that the network 210 may be a local area network (LAN), wide area network (WAN), the Internet or any known network that couples a plurality of computers to enable various modes of communication via network messages. For example, the network environment may be a corporate intranet including a single server and multiple personal computers housed within a single facility, or alternatively, multiple servers with multiple personal computers located in various geographic locations.

Since all the information of the above-described report is currently available in the change management product, a method of the present disclosure will extract all the above mentioned information from its physical data storage, e.g., the source control repository. The method of retrieving the information and generating the report will now be described in relation to FIGS. 3 and 4. This report will be available at three levels:

1. User based
2. Project based from an administrator tool
3. Enterprise level

1. User Based

The user based report will contain information pertaining to a single logged in user. This functionality may be invoked from a button on a toolbar or a menu item in the change control management (CCM) software client. Preferably, this functionality will be available from the client software. This report will contain all the checked out file details for a single user. The user interface will allow the user to configure the report and search by specifying the following parameters or variables: Repository Name, Project Name, State Name, Package group, Package Name, Physical location of the checked out file (\\MachineName\Fully Qualified Path), Actual repository location of the file in the LCM (View Path), Date when the file was checked out, Other Misc information (branched files, versions, Status (Released or not), Creator, Created on, Modifier, Modified on). In a Windows™ based system, the information will be presented in a grid, which will allow a user to sort the results, rearrange the column and search for key attributes, e.g., file names.

Figure 3A:
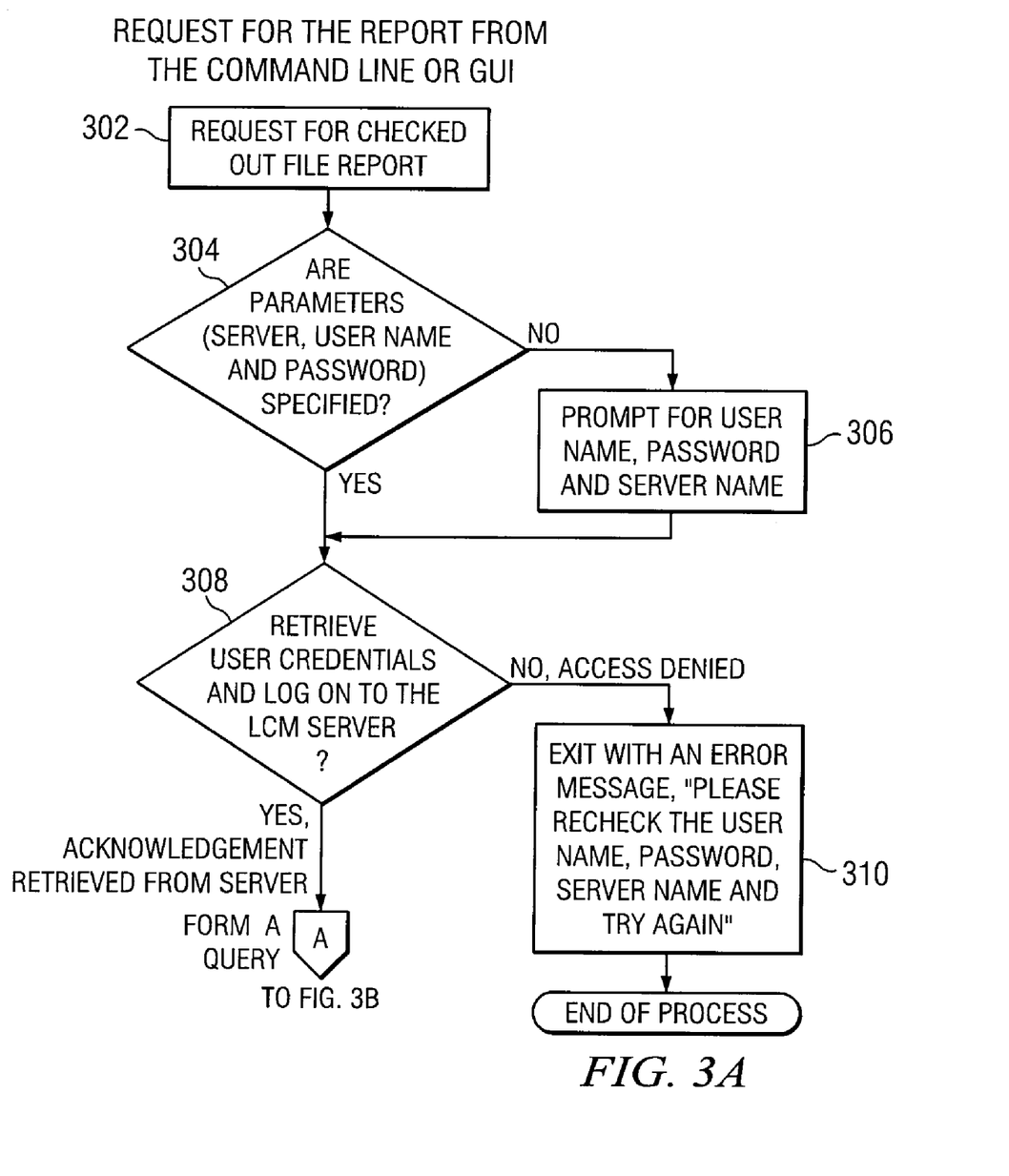
FIGS. 3A and B are flowcharts for illustrating a method for file management in accordance with an embodiment of the present disclosure.
Figure 3B:
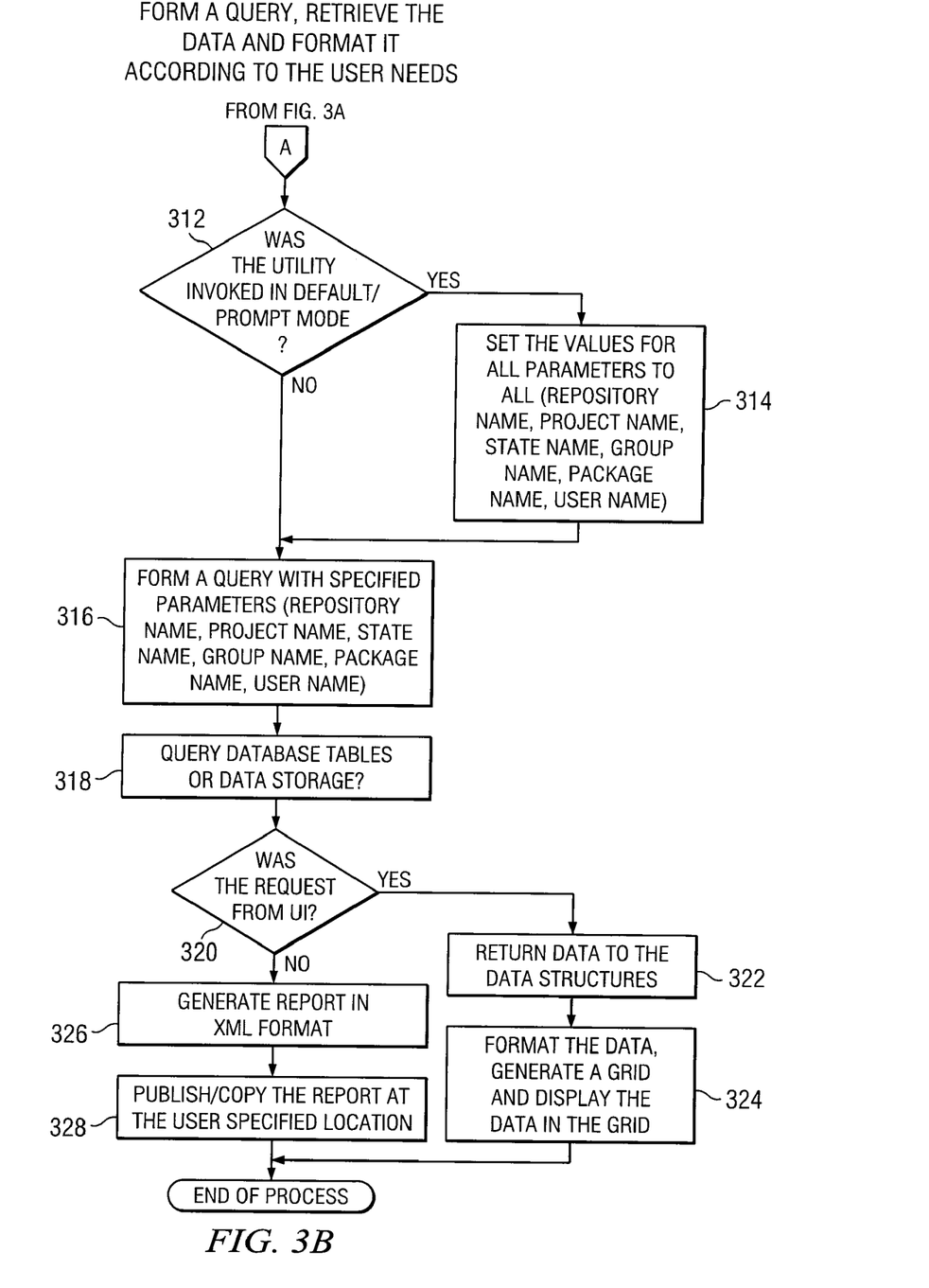

Referring to FIGS. 3A-B, the method is initiated when a user requests the checked-file report (step 302). The method then determines if certain parameters are specified, e.g., server, user name and password (step 304). If the parameters are not specified, the method will prompt the user for user name, password and server name (step 306). Once the parameters are specified, the method will attempt to log on the user to the server by verifying the user's credentials (step 308). If access is denied, the method will exit the program with an error message, e.g., "Please recheck the user name, password, server name and try again" (step 310) and the process will end.

If access is granted, at step 308, the method will formulate a query to derive the proper information for the report. The program will determine if the utility was invoked in default/prompt mode (step 312). If yes, the program will set the values for all parameters to ALL (Repository Name, Project Name, State Name, Group Name, Package Name, User Name) (step 314). Otherwise, the program will form a query with specified parameters (Repository Name, Project Name, State Name, Group Name, Package Name, User Name) (step 316). Once the parameters are specified, the program will query database tables or data storage to retrieve the proper information (step 318).

Next, the program will determine if the request was from the UI or a command line utility (step 320). If the request was from the UI, the data is returned to data structures (step 322) and the data is formatted, a grid is generated and the data is displayed in the gird (step 324).

If the request was not generated by the UI, the report will be generated in XML format (step 326). The report will then be published at the user-specified location (step 328).

2. Administrator Based

At an administrator's level, the report generated will be available from the CCM server. The CCM Administrator will be able to find out the checked out file information for the entire repository not just for a single user. This report will provide complete information as to where exactly the checked out source code items for the all the repository on a particular server are which is critical if an organization is going through a merger or an organization change. This report will enable users to quickly resume work on older projects and help administrators quickly locate user-specific changes. This is especially helpful with broken builds where the developer is unavailable and it is essential to obtain access to the file in order to fix it. This feature allows the administrator to obtain the latest version of the file without manually determining if there is another more recent version of the file available.

3. Enterprise Based

On an enterprise level, the report generated consolidates information from many multiple CCM products, brokers and servers. The report will have the ability to segregate the required information from disparate change control management products, servers and brokers.

The enterprise approach will interact with multiple Change Control Management (CCM) products. The method of the present disclosure will query both distributed environments employing servers and clients (e.g., via Computer Associates Harvest™) and mainframe environments (e.g., via Computer Associates Endevor™) to retrieve the reports for all the projects. Then, these reports will be combined by the program to provide an enterprise checkout change management (CM) report. As above, the report will be generated depending upon the logged in user's credentials. A user might be able to generate the report only for the projects for which he/she has access. The administrator will be able to view this report for all the projects across different source code repositories.

In a large organization, multiple LCM (Life Cycle Management) servers can be used for change management (CM). In this case one CM server will be designated as the master CM server. This server will register all the CM servers in an organization. The master server will then query all the registered servers for the checked out file report and then the master server will consolidate this report for a global CM checked out file report.

Figure 4A:
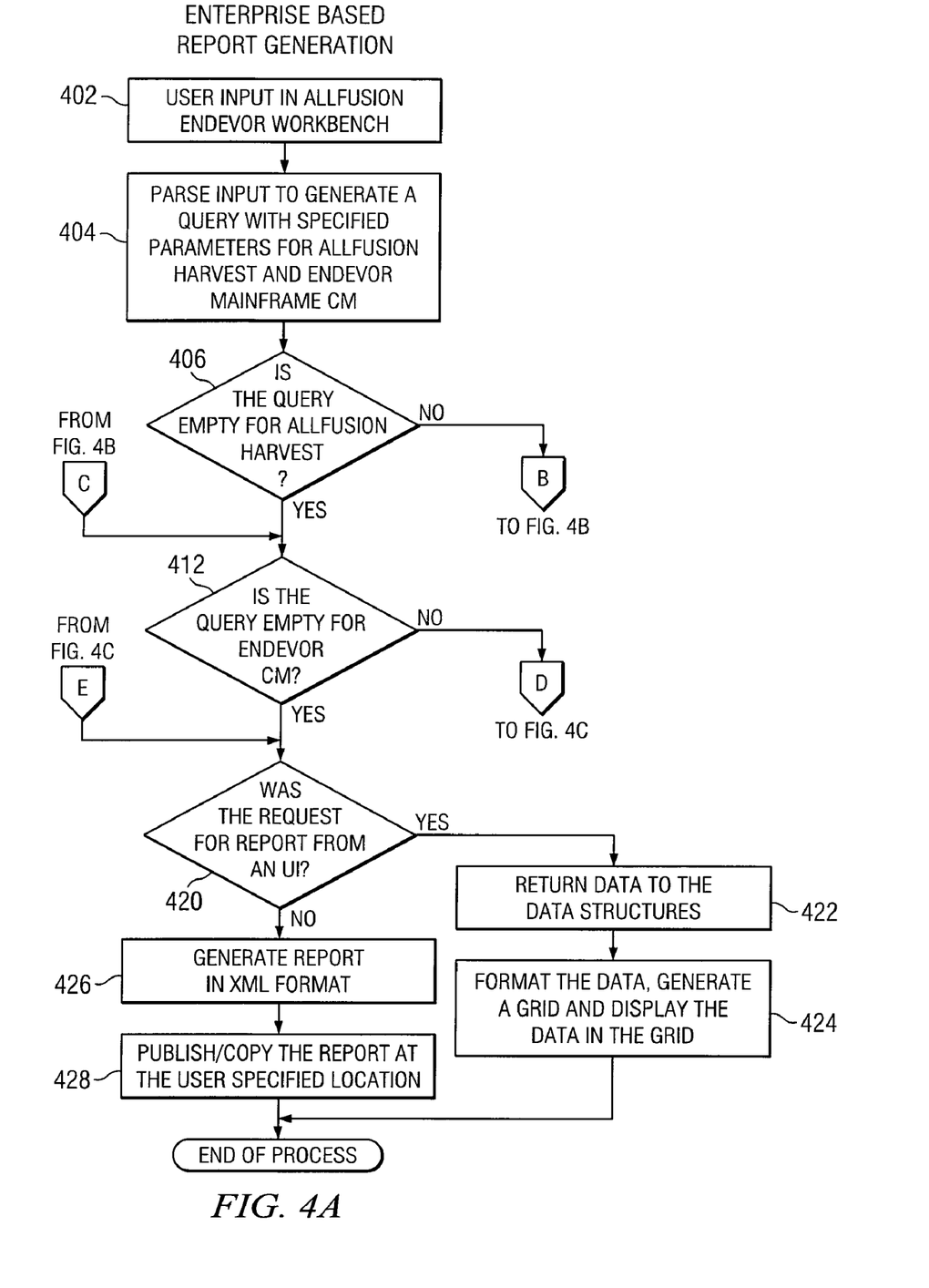
FIGS. 4A-C are flowcharts for illustrating a method for file management across an enterprise computing system in accordance with an embodiment of the present disclosure.
Figure 4B:
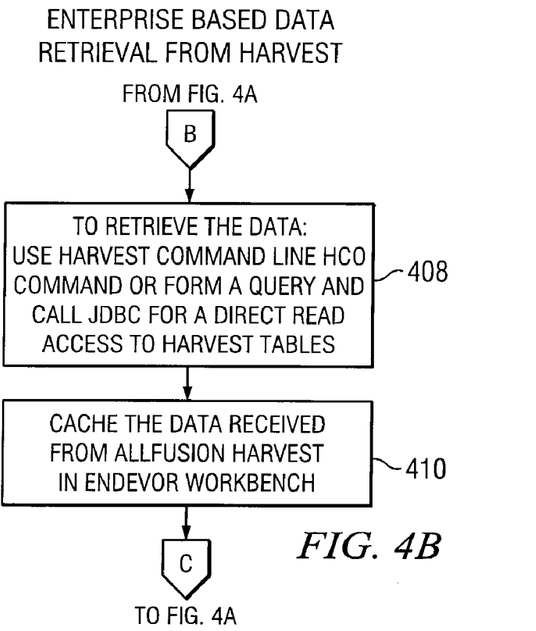
Figure 4C:
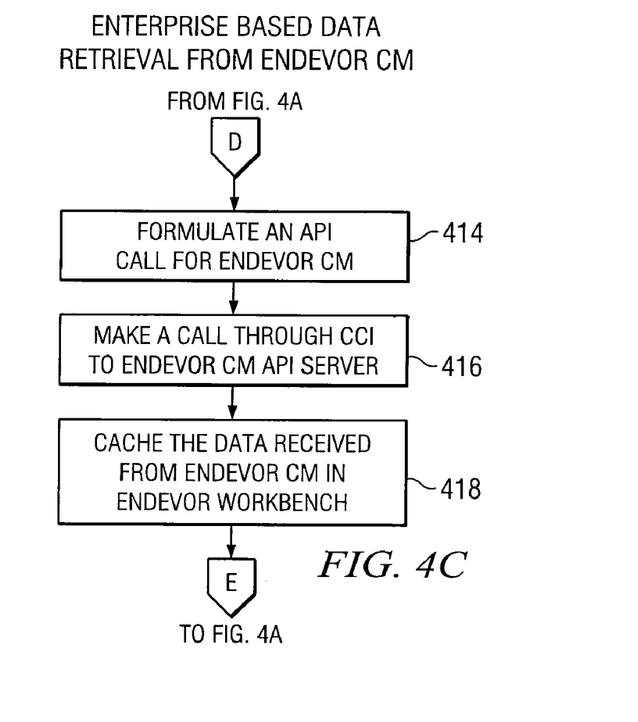

Referring to FIGS. 4A-C, a method for generating a checked out file report will be described. Initially, a user inputs parameters specifying the desired data (step 402), e.g., users, projects, servers, mainframes, etc. The application program then parses the input to generate a query with specified parameters for the distributed environment (e.g., Allfusion Harvest™ server) and for the mainframe environment (e.g., Endevor™ Mainframe CM) (step 404). Initially, the program determines if the query for the distributed environment is empty (step 406). If parameters exist for the distributed environment, the data is retrieved using a command line HCO command or the program forms a query and calls a JDBC (Java Database Connectivity) API (Application Program Interface) for a direct read access to the CCM tables (step 408). The data received is then cached (step 410).

Next, the program generates a query for the mainframe environment. The program determines if the query for the mainframe environment is empty, and if so, passes onto step 420. Otherwise, if the query has specified parameters, the program formulates an API call for the mainframe CCM software (step 414), makes a call through CCI to the mainframe CCM API Server (step 416) and caches the data received (step 418).

Once all the data has been retrieved, the program determines if the request for the report was generated from the UI (step 420). If yes, the program returns the data to data structures (step 422) and formats the data, generates a grid and displays the data in the grid (step 424). If the request did not come from the UI, the program generates the report in XML format (step 426) and publishes/copies the report at the user specified location (step 428).

The change management server will provide an ability to publish the checked out item report in a variety of formats, e.g., CSV and XML. This report can then be transmitted to an external application like backup agents or workflow applications. This feature enables variety of key functionalities like integration of this report with a workflow or a backup agent.

A new command line server utility capable of running on all the major platforms is implemented to create the report in addition to requesting the report from the UI. This command line utility will return the link to the actual location of the generated report. The key parameters to this utility are authentication, which is accomplished by retrieving the following information: login Information, including user name, password; and query parameters, including group name, user name for which the information is to be retrieved, repository name, project name, state name, package group, and package name. This may be accomplished by inputting specific commands. For instance, in the Harvest™ CM the following command line utility syntax may be used: hcf [-usr username] [-pw password] [-f full filename for checked out file report] [-b name] [-r repository name] [-p project name] [-s state name] [-g group name] [-n package name] [-u user name] [-prompt] [-o filename] [-h] [?] with each of the parameters described below in Table 1:

TABLE 1

| | |
|---|---|
| -usr | User Name |
| -pw | Password |
| -f | Fully qualified path and filename for the report |
| -b | Specifies the Harvest broker Name from which the report is to be generated |

TABLE 1-continued

| | |
|---|---|
| -r | Specifies the repository name for which the report is to be generated |
| -p | Specifies a particular project name for which the report is to be generated |
| -s | Specifies the Harvest ™ state Name from which the report is to be generated |
| -g | Specifies the group name, the report will be generated for all the users in this group |
| -n | Specifies a particular package name for which the report will be generated |
| -u | Specifies a particular user name from which the report is to be generated |
| -prompt | Prompts you for user name and password |
| -o filename | Specifies a file name to retrieves the output log. Both output and errors are directed to this file |
| -h or ? | Displays brief command usage |
| -no parameters | Displays brief command usage |
| -Default | Prompt for user name and password. Then generate the report for all the projects and repositories this user has access to. |

The report is generated only if the supplied user name and password has the required privileges for accessing the data; if the credentials do not have sufficient privileges then this command returns with an error message.

The generation of this report at the enterprise level can be resource intensive. Therefore, in such circumstance, initially, the existing database schema is evaluated to determine what time stamping mechanism is in place. This allows the server or broker based report to be generated and, if a new request for the report retrieval is received, then the server will be able to quickly determine what sections of the report needs to be regenerated. The time stamp of the report will be used by the server to determine which sections of the report are outdated. An SQL query can be run on the database tables to quickly determine what new changes has been made since the report was generated. For new requests, the server can selectively update the sections of the report.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A computer-implemented method for managing at least one checked out file in a source control repository, the method comprising the steps of:

receiving a request to generate a report for at least one checked one file in a source control repository, wherein the request includes an input specifying one or more values for one or more parameters associated with the at least one checked out file, wherein the one or more parameters are stored in a query database associated with the source control repository;

parsing the input to generate a first and a second query comprising the one or more values for the one or more specified parameters, wherein the first query triggers a call to a distributed environment for information relating to the at least one checked out file and the second query triggers a call to a mainframe environment for information relating to the at least one checked out file;

caching data retrieved from the first and second queries;

generating the report based on a combining of the cached data, wherein the report identifies the at least one checked out file and includes the one or more specified parameters;

storing the report with a time stamp in the query database, wherein the time stamp specifies when the report was generated and stored;

querying the query database to identify a change occurring after the time stamp to the one or more specified parameters;

as a result of the change, identifying one or more outdated sections of a latest version of the report;

automatically and selectively updating the one or more outdated sections of the latest version of the report to include the changes to the one or more parameters; and transmitting the updated report to an external computing device to initiate a backup of the updated version of the report and the at least one checked out file.

2. The computer-implemented method as in claim 1, wherein the at least one parameter is selected from the group consisting of repository name, project name, state name, package group, package name, physical location of the checked out file, actual repository location of the file, date when the file was checked out, version, and creator.

3. The computer-implemented method as in claim 1, wherein the report is in Extensible Markup Language (XML) format.

4. The computer-implemented method as in claim 1, wherein the report is generated through a user interface.

5. The computer-implemented method as in claim 1, wherein the at least one parameters comprises a predefined set of parameters.

6. The computer-implemented method as in claim 1, further comprising:
authenticating a user requesting the report.

7. The computer-implemented method as in claim 1, wherein the at least one section of the report is updated after a certain predetermined time.

8. The computer-implemented method as in claim 1, wherein the at least one section of the report is updated in response to a user request.

9. The computer-implemented method as in claim 1, further comprising publishing the report at a user-specified location.

10. The computer-implemented method as in claim 1, further comprising transmitting the report to an external application operable to use the report during the performance of one or more functions.

11. The computer-implemented method as in claim 10, wherein the external application comprises a workflow agent or a backup agent.

12. The computer-implemented method as in claim 1, wherein the at least one parameter comprises at least one default parameter that is not user-specified.

13. A system for managing at least one checked out file, comprising:
a source control repository including at least one checked out file;
a query database associated with a source control repository, the database including one or more parameters associated with the at least one checked out file; and
a control management server for:
receiving a request to generate a report for at least one checked one file in the source control repository, wherein the request includes an input specifying one or more values for one or more parameters associated with the at least one checked out file, wherein the one or more parameters are stored in the query database associated with the source control repository;

parsing the input to generate a first and a second query comprising the one or more values for the one or more specified parameters, wherein the first query triggers a call to a distributed environment for information relating to the at least one checked out file and the second query triggers a call to a mainframe environment for information relating to the at least one checked out file;

caching data retrieved from the first and second queries;

generating the report based on a combining of the cached data, wherein the report identifies the at least one checked out file and includes the one or more specified parameters;

storing the report with a time stamp in the query database, wherein the time stamp specifies when the report was generated and stored;

querying the query database to identify a change occurring after the time stamp to the one or more specified parameters;

as a result of the change, identifying one or more outdated sections of a latest version of the report;

automatically and selectively updating the one or more outdated sections of the latest version of the report to include the changes to the one or more parameters; and transmitting the updated report to an external computing device to initiate a backup of the updated version of the report and the at least one checked out file.

14. The system as in claim 13, wherein the at least one parameter is selected from the group consisting of repository name, project name, state name, package group, package name, physical location of the checked out file, actual repository location of the file, date when the file was checked out, version, and creator.

15. The system as in claim 13, wherein the report is in Extensible Markup Language (XML) format.

16. A set of computer-executable instructions for managing at least one checked out file, the computer-executable instructions being embodied in a computer-readable storage medium and when executed by a processor operable to:
receive a request to generate a report for at least one checked one file in a source control repository, wherein the request includes an input specifying one or more values for one or more parameters associated with the at least one checked out file, wherein the one or more parameters are stored in a query database associated with the source control repository;

parse the input to generate a first and a second query comprising the one or more values for the one or more specified parameters, wherein the first query triggers a call to a distributed environment for information relating to the at least one checked out file and the second query triggers a call to a mainframe environment for information relating to the at least one checked out file;

cache data retrieved from the first and second queries;

generate the report based on a combining of the cached data, wherein the report identifies the at least one checked out file and includes the one or more specified parameters;

store the report with a time stamp in the query database, wherein the time stamp specifies when the report was generated and stored;

query the query database to identify a change occurring after the time stamp to the one or more specified parameters;

as a result of the change, identify one or more outdated sections of a latest version of the report;

automatically and selectively update the one or more outdated sections of the latest version of the report to include the changes to the one or more parameters; and transmit the updated report to an external computing device to initiate a backup of the updated version of the report and the at least one checked out file.

17. The computer-executable instructions as in claim 16, wherein the at least one parameter is selected from the group consisting of repository name, project name, state name, package group, package name, physical location of the checked out file, actual repository location of the file, date when the file was checked out, version, and creator.

18. The computer-executable instructions as in claim 16, wherein the one or more parameters comprise a predetermined set of parameters.

19. The computer-executable instructions as in claim 16, further comprising the step of authenticating the user requesting the report.

20. The computer-executable instructions as in claim 16, further operable when executed to update the at least one section of the report after a certain predetermined time.

21. The computer-executable instructions as in claim 16, further operable when executed to update the at least one section of the report in response to a user request.

22. The computer-executable instructions as in claim 16, further operable when executed to publish the report at a user-specified location.

23. The computer-executable instructions as in claim 16, further operable when executed to transmit the report to an external application operable to use the report during the performance of one or more functions.

24. The computer-executable instructions as in claim 23, wherein the external application comprises a workflow agent or a backup agent.

25. The computer-executable instructions as in claim 23, wherein the at least one parameter comprises at least one default parameter that is not user-specified.

\* \* \* \* \*